April 1, 1958    F. COUSSEMANT    2,829,165
CATALYTIC CONVERSION OF SECONDARY ALCOHOLS TO KETONES
Filed Jan. 12, 1956
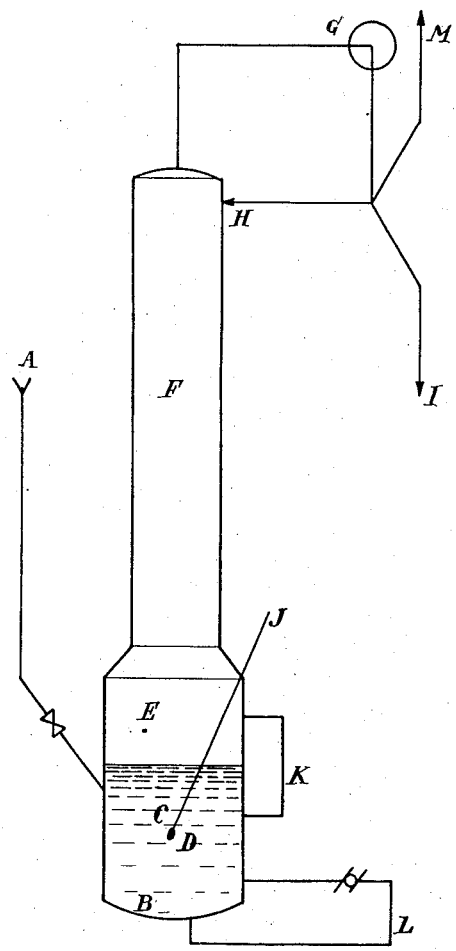
Inventor
F. Coussemant

United States Patent Office

2,829,165
Patented Apr. 1, 1958

2,829,165

CATALYTIC CONVERSION OF SECONDARY ALCOHOLS TO KETONES

Fernand Coussemant, Saint-Cloud, France

Application January 12, 1956, Serial No. 558,653

Claims priority, application France October 8, 1951

5 Claims. (Cl. 260—586)

This application is a continuation-in-part of my copending application Serial No. 311,690, filed September 26, 1952, and now abandoned, relates to catalytic conversion of secondary alcohols to ketones.

I have found, according to the present invention, that such process is highly efficient to produce ketones from secondary alcohols in the liquid phase if the reaction medium comprises a non-hydrogenatable liquid solvent for suspending the catalyst and dissolving the reagents, the solvent being sufficiently high boiling to allow continuous removal of the ketone from the liquid reaction medium as it is formed.

The reaction runs with high efficiency to convert secondary alcohols to the corresponding ketones at atmospheric pressures, but since the reaction product ketone is volatilized as it is formed in the reaction medium together with some of the alcohol, and water, if the alcohol contains any, oftimes tends to form azeotropes during distillation, it is sometimes desirable to vary the pressure upon the system. Raised pressures are accordingly feasible up to 500 p. s. i., but raised or reduced pressures, when used, will be variable, largely dictated by specific pressure conditions for effecting satisfactory rectification of vapors where the formation of azeotropes is a problem. Otherwise, operation in the presence of raised, reduced or atmospheric pressure is a matter of choice with respect to efficient operation of the present catalytic dehydrogenation of secondary alcohols to ketones of this invention.

The most common prior art methods of catalytically dehydrogenating secondary alcohols to ketones has been by vapor phase procedures requiring relatively high temperatures (300 to 500° C.) to maintain vapor phase conditions and to secure sufficient conversion. Other disadvantages of this method are considerable wear and disintegration, such as fritting, of catalysts operated in contact with gases; very low efficiency of the dehydrogenation necessitating return of large quantities of unreacted secondary alcohol to the cycle; the concurrence of side reactions interfering with the purity of the hydrogen produced; decomposition of ketone to methane and carbon monoxide; dehydration of alcohol to olefine and condensation of olefine with the ketone; and finally, complex and expensive apparatus necessary to dispose the catalyst in furnace tubes at closely regulated temperatures and handling of the catalyst for regeneration, cleaning and replacement. These many disadvantages are overcome in liquid phase operation of the present invention.

It has also been proposed to dehydrogenate secondary alcohols to ketones in the liquid phase, notably as shown in the U. S. patents to Aschan No. 994,437 and Henke No. 1,933,215. These prior processes both are highly inefficient in that the ketone is not removed as it is produced, thereby tending to stop the reaction at about 25% yields or slow it to an uneconomical rate. Some attempt to remove hydrogen occluded by the catalyst by use of a hydrogenatable solvent like benzene, as shown in the Henke patent, has been a minor improvement, but the efficiency is still too low since the solvent soon becomes saturated and the reaction rate again drops. Moreover, hydrogenatable solvents, because of their readily reactable and hydrogenatable character, tend to form complexes with the catalyst to lower the efficiency and rate of reaction.

Besides Aschan uses a solvent in order to dissolve borneols or isoborneols at a reaction temperature which is generally lower than the melting temperature of borneols and isoborneols.

On the contrary a solvent is used according to the present invention in order to make it easier to proceed at a temperature not lower than the boiling temperature of the ketone formed under the pressure employed and as a consequence to obtain a very significant increase of the reaction speed. The solvent medium used is saturated hydrocarbon or so substantially saturated that it will not hydrogenate under usual conditions existing in the present dehydrogenation reaction. The solvent, moreover, is preferably one which is quite high boiling so that it will not be substantially vaporized under the conditions of the present dehydrogenating reaction and will remain in a liquid phase, preferably at temperatures in the range of 100 to 250° C. at atmospheric pressure, which are the conditions under which the present reaction is preferably operated.

That hydrocarbon is typically saturated paraffin or saturated naphthene. Typically useful solvents are such naphthenic hydrocarbons as tetradecahydroanthracene and, as illustrated by such substance, the naphthenic hydrocarbons hereof will usually have at least two cyclic nuclei. Heavy paraffinic hydrocarbons as typified by triacontane may also be used according to the invention. Mixed hydrocarbon types, such as naphthenic ring hydrocarbons of at least two rings in the molecule with long paraffinic side chains, are useful and a typical example is hexadecyldecahydronaphthalene. Commercial hydrocarbon mixtures, such as oils and tars, may be used which have been hydrogenated and comprise high boiling liquids at the temperature of the reaction. The hydrocarbon liquid solvent does not need to be fully saturated, but it must be sufficiently saturated so that the hydrocarbon liquid under the conditions of the reaction will not be further hydrogenated.

A useful test to determine the suitability of a hydrocarbon liquid as a solvent in this reaction is to mix the solvent liquid with an equal quantity of a readily hydrogenatable liquid hydrocarbon such as benzene, and then hydrogenate the mixture under high pressure. The benzene must be substantially hydrogenated under these hydrogenating conditions before the high boiling liquid is hydrogenated.

The following illustrates such solvent test procedure in detail:

Into an autoclave having a capacity of about 400 cc. and provided with a good agitating system are introduced 100 cc. of benzene, 100 cc. of the high boiling solvent to be tested and 10 g. of hydrogenating catalyst, such as Raney nickel. The mixture is heated to 100° C. and hydrogen is introduced under a pressure of 50 kg. The pressure is allowed to decrease to 10 kg. under agitation. Hydrogen is then re-introduced under a pressure of 50 kg. and the cycle is repeated until the absorption of the hydrogen ceases. This cessation must correspond to a hydrogenation of at least 90% of the benzene. The time necessary for the absorption of the charge corresponding to 90% must not be more than double the time necessary for the absorption of the first charge. The high boiling hydrocarbon solvent substance must not hydrogenate substantially before 90% of benzene is converted into cyclohexane (5% at a maximum).

The solvent substance serves the purpose of forming a liquid reaction medium in which the finely divided catalyst may be suspended. Accordingly, the requisite quantity of the solvent medium is merely enough to suspend the catalyst. A typical useful range is from about 3 to 20 times as much solvent by weight as the weight quantity of catalyst suspended therein.

The catalyst used herein is a typically known dehydrogenation catalyst for this reaction and comprises a metal of groups 1, 2, 7 and 8 of the periodic table of classification. Particularly I prefer copper, nickel, zinc or magnesium or mixtures thereof, and it is sometimes desirable to include tin or lead in admixture with one or more of these metals. In practice I prefer to use a commercially available dehydrogenation catalyst such as Raney nickel or Raney copper, etc.

Any volatilizable ketone may be formed from its corresponding secondary alcohol by the present procedure and such ketones as acetone, methyl ethyl ketone and cyclohexanone are specific examples of ketones which may be readily prepared in a highly efficient reaction by the present procedure, respectively, from isopropanol, 2-butanol or cyclohexanol.

Accordingly, in typical procedure, a dehydrogenation catalyst such as Raney nickel is suspended in a high boiling liquid solvent as above identified and the suspension heated to a temperature substantially exceeding the boiling point of the ketone to be produced, preferably in the range of 100 to 250° C., and at a pressure corresponding to desired distillation conditions, atmospheric or higher, and the secondary alcohol to be dehydrogenated is introduced as a liquid or vapor at a rate of from about ½ to 10 kgs. per kg. of catalyst per hour, and the reaction proceeds continuously, the ketone being volatilized as rapidly as it is formed.

The accompanying diagram shows a plant for carrying out the process according to the invention.

The alcohol B is introduced at A into the reactor E provided with agitation means L, temperature-regulating means J and level-regulating means K. The catalyst C and the solvent D are also introduced into the reactor E. The reactor E has directly mounted thereon, or is followed by, a rectification apparatus, the effectiveness of which regulates the desired purity of the ketone. The ketone vapors are condensed at G and withdrawn at I. The hydrogen is liberated at M. A small portion, 5 to 10% of the condensed ketone, may be re-introduced into the device F through a reflux device H merely to aid rectification of the vapors.

The following specific examples illustrate the practice of this invention: Parts are by weight.

Acetone 3 parts of Raney nickel, 20 parts of tetradecahydroanthracene and 0.5 part of isopropyl alcohol are stirred in a vessel and heated to 135° C. under atmospheric pressure.

The vessel leads to a distillation column filled with a packing (e. g. Raschig rings) through which the vapours are rectified. Acetone and hydrogen are withdrawn from top of the column, part of the acetone being fed back to the column as a reflux. The non-reacted alcohol and the tetradecahydroanthracene which had been entrained in the distillation column by the vapours are retrograded to the reactor.

The vessel is fed continuously with alcohol.

Ratio of the weights of catalyst and solvent: 0.15
Production of acetone: 2.1 kg. per kg. of catalyst and per hour
Yield:

$$\frac{\text{Mol of acetone formed}}{\text{Mol of converted alcohol}} \times 100 = 99.2$$

Concentration of acetone in relation to the total weight of acetone+2-propanol, in the effluent of the reactor: 31%

Purity of the product after rectification: 99% weight
Duration of the experiment: 20 hours

Methyl ethyl ketone 3 parts of Raney nickel, 20 parts of tetradecahydroanthracene and 0.75 part of 2-butanol are stirred in a vessel and heated to 142° C. under atmospheric pressure.

The vessel leads to a distillation column filled with a packing (e. g. Raschig rings) through which the vapours are rectified. Methyl ethyl ketone and hydrogen are withdrawn from top of the column, part of the methyl ethyl ketone being fed back to the column as a reflux. The non-reacted alcohol and the tetradecahydroanthracene which has been entrained in the distillation column by the vapours are retrograded to the reactor.

The vessel is fed continuously with alcohol.

Ratio of the weights of catalyst and solvent: 0.15
Production of methyl ethyl ketone: 1.1 kg. per kg. of catalyst and per hour
Yield:

$$\frac{\text{Mol of ketone formed}}{\text{Mol of converted alcohol}} \times 100 = 99.6$$

Concentration of the methyl ethyl ketone with respect to the total methyl ethyl ketone+2-butanol, in the effluent of the reactor: 25%
Purity of the product after rectification: 99% weight
Duration of the experiment: 30 hours

Cyclohexanone 6 parts of Raney nickel, 20 parts of tetradecahydroanthracene and 7 parts of cyclohexanol are stirred in a vessel and heated to 160° C. under atmospheric pressure.

The vessel leads to a distillation column filled with a packing (e. g. Raschig rings) through which the vapours are rectified cyclohexanone and hydrogen are withdrawn from top of the column, part of the cyclohexanone fed back to the column as a reflux. The non-reacted alcohol and the tetradecahydroanthracene which has been entrained in the distillation column by the vapours are retrograded to the reactor.

The vessel is fed continuously with alcohol.

Ratio of the weights of catalyst and cyclohexanol: 0.30
Production of cyclohexanone: 0.9 kg. per kg. of catalyst per hour
Yield:

$$\frac{\text{Mol of cyclohexanone formed}}{\text{Mol of converted cyclohexanone}} \times 100 = 99.5$$

Concentration of the cyclohexanone in the effluent from the reactor: 24% weight
Duration of the experiment: 60 hours

I claim:

1. Process of producing ketones by dehydrogenation in the liquid phase of the corresponding secondary alcohols in the presence of dehydrogenation catalysts, comprising contacting the alcohol with a dehydrogenation catalyst suspended in a saturated liquid hydrocarbon selected from the group consisting of paraffin and naphthene having a boiling point higher than the boiling point of the ketone produced, whereby said ketone is readily removed from said liquid hydrocarbon medium at a rate sufficient to prevent accumulation of any substantial quantity of ketone as formed in said hydrocarbon liquid at a temperature above the boiling point of the produced ketone under the pressure employed, and continuously removing the hydrogen and ketone thus formed in the reaction medium, by distillation.

2. Process as defined in claim 1, wherein the temperature of said liquid hydrocarbon is maintained sufficiently in excess of the boiling point of the alcohol to substantially increase the reaction rate.

3. The process according to claim 1, wherein the ketone is acetone and the secondary alcohol is isopropyl alcohol.

4. The process according to claim 1, wherein the ketone is methyl ethyl ketone and the secondary alcohol is methyl ethyl carbinol.

5. The process according to claim 1, wherein the ketone is cyclohexanone and the secondary alcohol is cyclohexanol.

References Cited in the file of this patent
UNITED STATES PATENTS

| | | |
|---|---|---|
| 994,437 | Aschan et al. | June 6, 1911 |
| 2,746,993 | Dean | May 22, 1956 |